US010810792B2

(12) United States Patent
Kehl et al.

(10) Patent No.: US 10,810,792 B2
(45) Date of Patent: Oct. 20, 2020

(54) INFERRING LOCATIONS OF 3D OBJECTS IN A SPATIAL ENVIRONMENT

(71) Applicant: TOYOTA RESEARCH INSTITUTE, INC., Los Altos, CA (US)

(72) Inventors: Wadim Kehl, San Francisco, CA (US); German Ros Sanchez, Mountain View, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 328 days.

(21) Appl. No.: 15/994,762

(22) Filed: May 31, 2018

(65) Prior Publication Data

US 2019/0371052 A1 Dec. 5, 2019

(51) Int. Cl.
| | |
|---|---|
| *G06T 17/05* | (2011.01) |
| *G01C 21/32* | (2006.01) |
| *G06K 9/00* | (2006.01) |
| *G06K 9/62* | (2006.01) |
| *G06K 9/46* | (2006.01) |
| *G06T 7/521* | (2017.01) |
| *G06K 9/32* | (2006.01) |

(52) U.S. Cl.
CPC .............. *G06T 17/05* (2013.01); *G01C 21/32* (2013.01); *G06K 9/00805* (2013.01); *G06K 9/00825* (2013.01); *G06K 9/3233* (2013.01); *G06K 9/46* (2013.01); *G06K 9/6256* (2013.01); *G06T 7/521* (2017.01)

(58) Field of Classification Search
CPC ..... G06T 17/05; G06T 7/521; G06K 9/00805; G06K 9/3233; G06K 9/46; G06K 9/6271; G06K 9/6256; G06K 9/00825; G01C 21/32; G05D 1/004; G05D 1/0251
See application file for complete search history.

(56) References Cited

U.S. PATENT DOCUMENTS

| | | | | |
|---|---|---|---|---|
| 8,090,194 | B2 * | 1/2012 | Golrdon | G01B 11/2513 |
| | | | | 382/154 |
| 8,553,989 | B1 * | 10/2013 | Owechko | G06K 9/00201 |
| | | | | 345/419 |
| 9,476,730 | B2 | 10/2016 | Samarasekera et al. | |
| 9,633,483 | B1 | 4/2017 | Xu et al. | |
| 9,734,455 | B2 | 8/2017 | Levinson et al. | |
| 9,796,400 | B2 | 10/2017 | Puttagunta et al. | |
| 10,192,113 | B1 * | 1/2019 | Liu | G06K 9/00664 |
| 2014/0350839 | A1 * | 11/2014 | Pack | G05D 1/0214 |
| | | | | 701/409 |
| 2017/0132334 | A1 | 5/2017 | Levinson et al. | |
| 2018/0101720 | A1 * | 4/2018 | Liu | G01S 17/89 |

(Continued)

*Primary Examiner* — Carol Wang
(74) *Attorney, Agent, or Firm* — Seyfarth Shaw LLP

(57) ABSTRACT

A method for inferring a location of a three-dimensional (3D) object, the method includes receiving sensor data from a plurality of sensors of an autonomous vehicle. The method also includes mapping features extracted from the sensor data to a first data structure corresponding to a feature space of a 3D representation of a spatial area. The method further includes classifying the merged features to identify an object within a vicinity of the autonomous vehicle and projecting a 3D representation of the identified object to a location of the 3D feature space. The method still further includes controlling an action of the autonomous vehicle based on the projected 3D representation.

14 Claims, 7 Drawing Sheets

(56) References Cited

U.S. PATENT DOCUMENTS

| | | | |
|---|---|---|---|
| 2018/0143647 A1* | 5/2018 | Wang | G01S 17/86 |
| 2018/0144496 A1* | 5/2018 | Posner | G06T 7/73 |
| 2018/0225968 A1* | 8/2018 | Wang | G01S 5/16 |
| 2019/0147250 A1* | 5/2019 | Zhang | G01S 7/4808 |
| | | | 382/224 |
| 2019/0179024 A1* | 6/2019 | Englard | G01S 17/86 |
| 2019/0258894 A1* | 8/2019 | Zeng | G06K 9/00798 |
| 2019/0332118 A1* | 10/2019 | Wang | G05D 1/0088 |
| 2020/0019794 A1* | 1/2020 | Engelcke | G06N 3/04 |

* cited by examiner

INFERRING LOCATIONS OF 3D OBJECTS IN A SPATIAL ENVIRONMENT

BACKGROUND

Field

Certain aspects of the present disclosure generally relate to machine learning and, more particularly, to a system and method for inferring a location of a three-dimensional (3D) object with respect to a location of an autonomous agent.

Background

Autonomous agents (e.g., vehicles, robots, drones, etc.) and semi-autonomous agents use machine vision for analyzing areas of interest in a surrounding environment. Although scientists have spent decades studying the human visual system, a solution for realizing equivalent machine vision remains elusive. Machine vision is distinct from the field of digital image processing due to the desire to recover a three-dimensional (3D) structure of the world from images and using the 3D structure for fully understanding a scene. That is, machine vision strives to provide a 3D view of the environment that surrounds an autonomous agent.

In operation, autonomous agents may rely on a trained convolutional neural network (CNN) to identify objects within areas of interest in an image of a surrounding environment. For example, a CNN may be trained to identify and track objects captured by one or more sensors, such as light detection and ranging (LIDAR) sensors, sonar sensors, red-green-blue (RGB) cameras, RGB-depth (RGB-D) cameras, and the like. The sensors may be coupled to, or in communication with, a device, such as the autonomous agent. Object detection applications for autonomous agents may analyze sensor image data for detecting objects (e.g., pedestrians, cyclists, other cars, etc.) in the surrounding scene from the autonomous agent.

In conventional systems, a two dimensional (2D) bounding box identifies objects of interest within the autonomous agent's field of view. After drawing the 2D bounding box around each object of interest, conventional systems use additional information to convert the identified 2D object to a 3D object. By converting the 2D object to the 3D object, the autonomous agent may estimate the object's dimensions, the object's orientation, and estimate a distance to the object.

Converting 2D objects to 3D objects increases the use of system resources and increases object detection times. It is desirable to improve object detection systems by bypassing the 2D to 3D object conversion, such that 3D objects are inferred based on a combination of features extracted from different sensor outputs.

SUMMARY

In one aspect of the present disclosure, a method for inferring a location of a three-dimensional (3D) object is disclosed. The method includes receiving sensor data from a plurality of sensors of an autonomous vehicle. The method also includes mapping features extracted from the sensor data to a first data structure corresponding to a feature space of a 3D representation of a spatial area. The method further includes classifying the merged features to identify an object within a vicinity of the autonomous vehicle. The method still further includes projecting a 3D representation of the identified object to a location of the 3D feature space. The method also includes controlling an action of the autonomous vehicle based on the projected 3D representation.

In another aspect of the present disclosure, a non-transitory computer-readable medium with non-transitory program code recorded thereon is disclosed. The program code is for inferring a location of a 3D object. The program code is executed by a processor and includes program code to receive sensor data from a plurality of sensors of an autonomous vehicle. The program code also includes program code to map features extracted from the sensor data to a first data structure corresponding to a feature space of a 3D representation of a spatial area. The program code further includes program code to classify the merged features to identify an object within a vicinity of the autonomous vehicle. The program code still further includes program code to project a 3D representation of the identified object to a location of the 3D feature space. The program code also includes program code to control an action of the autonomous vehicle based on the projected 3D representation.

Another aspect of the present disclosure is directed to an apparatus for inferring a location of a 3D object. The apparatus having a memory and one or more processors coupled to the memory. The processor(s) is configured to receive sensor data from a plurality of sensors of an autonomous vehicle. The processor(s) is also configured to map features extracted from the sensor data to a first data structure corresponding to a feature space of a 3D representation of a spatial area. The processor(s) is further configured to classify the merged features to identify an object within a vicinity of the autonomous vehicle. The processor(s) still further configured to project a 3D representation of the identified object to a location of the 3D feature space. The processor(s) is also configured to control an action of the autonomous vehicle based on the projected 3D representation.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
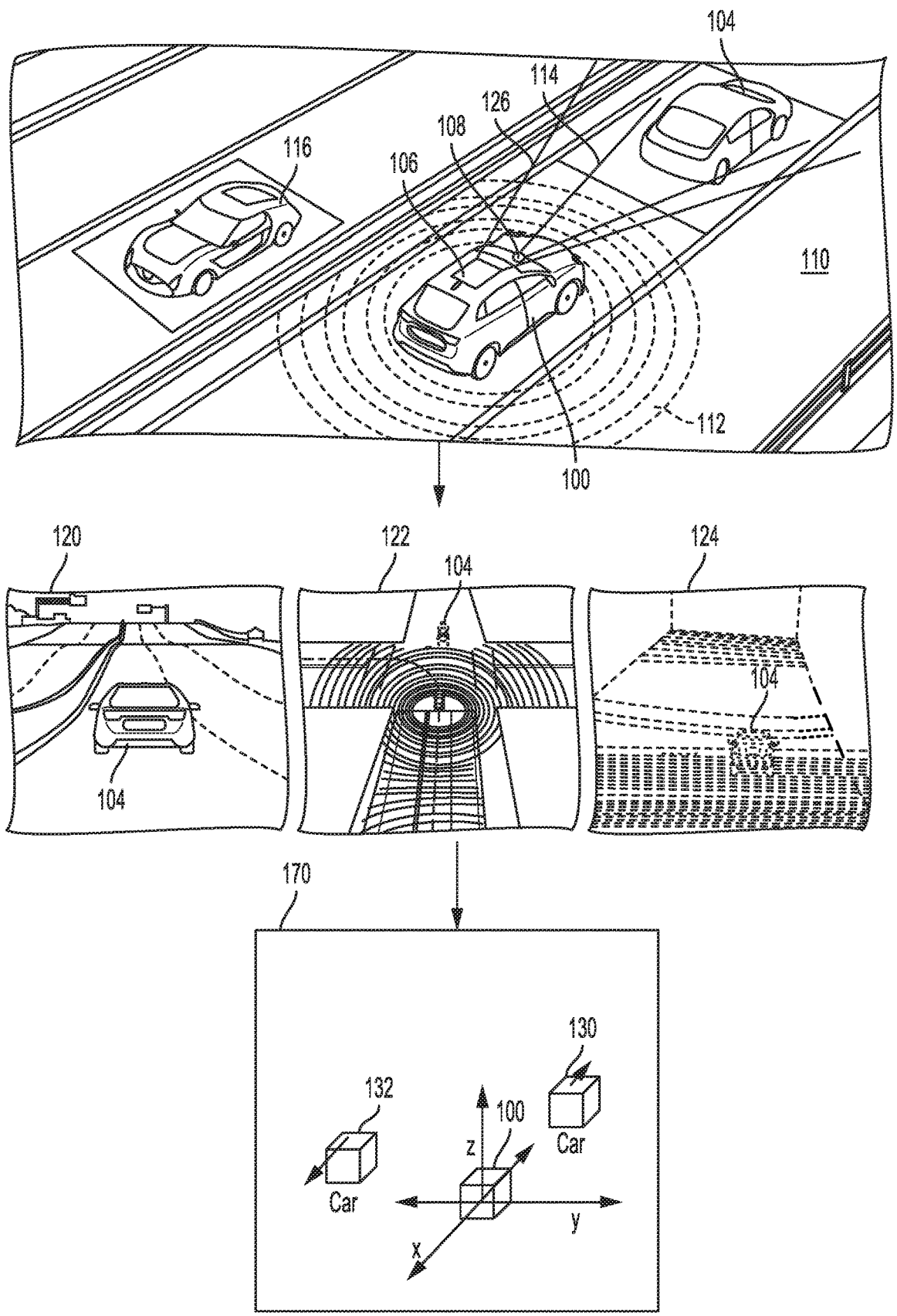
FIG. 1 illustrate an example of an agent using a 3D inference system according to aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

Actions of autonomous agents and semi-autonomous agents may be controlled or adjusted based on detected objects within a vicinity of the agent. For example, a route may be planned for an autonomous agent based on the locations of other objects on the road. As another example, a route may be adjusted to avoid a collision if an object is detected to be in the path of the agent. In the present application an agent refers to an autonomous agent or a semi-autonomous agent.

The agent may detect objects from outputs of various sensors. For example, a 2D camera may generate 2D RGB images and a LIDAR sensor may generate a 3D point cloud that provides height and depth information. In contrast to conventional systems, aspects of the present disclosure do not limit object localization to areas within 2D bounding boxes. Rather, objects are localized based on features extracted from different sensor outputs.

In one configuration, features are extracted from different sensor outputs. The extracted features may be matched, reshaped, and mapped to elements of a data structure. The data structure, such as a vector, corresponds to a feature space of a 3D representation of a spatial environment. The 3D representation may be a 3D grid that is partitioned into multiple cells. The cells may be partitioned to have different sizes and/or orientations based on various factors.

For example, one 3D grid may represent an area that is directly in front of an agent. In this example, cells of the 3D grid may be uniformly partitioned into rows and columns of cells. As another example, cells of the 3D grid may be partitioned based on polar coordinates centered at the agent. Each cell layout of a 3D grid may be represented by parameters (e.g., elements) in a one-dimensional data structure, such as a vector. Accordingly, each 3D grid may be reconstructed based on the elements of a corresponding vector.

The elements of a vector may be processed to determine whether a cell contains features for object recognition. Empty cells may be ignored. Using a trained artificial neural network, features of the non-empty cells are analyzed to identify one or more of a class of an object, orientation of the object, and/or distance to the object. An action of the agent may be controlled based on one or more of the class, location/distance, and/or orientation of the object.

FIG. 1 illustrate an example of an agent 100 using a 3D inference system according to aspects of the present disclosure. As shown in FIG. 1, the agent 100 may be traveling on a road 110. A first vehicle 104 may be ahead of the agent 100 and a second vehicle 116 may be adjacent to the agent 100. In this example, the 3D inference system of the agent 100 is in communication with a 2D camera 108, such as a 2D RGB camera, and a LIDAR sensor 106. The 2D camera 108 and the LIDAR sensor 106 may be integrated with the agent 100. Other sensors, such as RADAR and/or ultrasound, are also contemplated. Additionally, or alternatively, the agent 100 may include one or more additional 2D cameras and/or LIDAR sensors. For example, the additional sensors may be side facing and/or rear facing sensors.

In one configuration, the 2D camera 108 captures a 2D image 120 that includes objects in the 2D camera's 108 field of view 114. The LIDAR sensor 106 may generate one or more output streams 122, 124. The first output stream 122 may include a 3D cloud point of objects in a first field of view, such as a 360° field of view 112 (e.g., bird's eye view). The second output stream 124 may include a 3D cloud point of objects in a second field of view, such as a forward facing field of view 126.

The 2D image 120 captured by the 2D camera includes a 2D image of the first vehicle 104, as the first vehicle 104 is in the 2D camera's 108 field of view 114. The 3D inference system of the agent 100 may extract features from objects of interest in the 2D image 120. For example, an artificial neural network, such as a convolutional neural network, of the 3D inference system extracts features of the first vehicle 104. The extracted features may be transmitted to a reshape module of the 3D inference system.

As is known to those of skill in the art, a LIDAR sensor uses laser light to sense the shape, size, and position of objects in an environment. The LIDAR sensor may vertically and horizontally scan the environment. In the current example, the artificial neural network of the agent 100 may extract height and/or depth features from the first output stream 122. The artificial neural network of the agent 100 may also extract height and/or depth features from the second output stream 124. The extracted features may be transmitted to the reshape module of the 3D inference system.

The features may be encoded in a data structure, such as a tensor, as explained in detail herein. The reshape module may reshape the features obtained by the tensors and map the reshaped tensors to a vector corresponding to a feature space. The feature space represents the layout of cells of a 3D grid. As previously discussed, the 3D grid represents a spatial area within a vicinity of the agent 100. In one example, the 3D grid may be the spatial area directly in front of the agent 100. As another example, the 3D grid may be a 360° area around the agent 100.

In this configuration, the features mapped to the vector correspond to specific cells of the 3D grid. The features of the vector may be analyzed by a trained neural network to classify objects in the spatial area. The classification may include determining a class label of an object, the spatial dimensions of the object, an orientation of the object with respect to the agent, and/or other attributes. By classifying the features, aspects of the present disclosure may detect 3D objects without using a 2D bounding box to first identify objects in a 2D representation of a spatial area.

For example, as shown in FIG. 1, after classifying the features of a vector, the classified objects 130, 132 may be represented in a 3D map 170 of the agent's 100 surroundings. A first classified object 130 corresponds to the first vehicle 104 and a second classified object 132 corresponds to the second vehicle 116.

The locations of the classified objects 130, 132 in the 3D map 170 may be based on a cell layout of a 3D grid (not shown) corresponding to the spatial area in the 3D map 170. Based on the classified features, the 3D map 170 may also indicate an orientation of each classified object 130, 132 and/or a class of each classified object 130, 132 (car). Each classified object 130, 132 may be represented by a bounding box that may correspond to the dimensions of the vehicle 104, 116. Actions, such as route planning and/or collision avoidance, may be performed or updated in response to classifying each object 130, 132.

According to aspects of the present disclosure, 3D grids may use different layouts (e.g., feature spaces) for different scenarios. Each 3D grid includes multiple cells. The size and/or layout of the cells may be based on a current behavior of the agent (e.g., stopped, moving, current speed, etc.), a current location of the agent (e.g., parking lot, freeway, school zone, residential area, etc.), a planned route of the agent, a driving direction of the agent, previously detected objects within a vicinity of the agent, sensors types, terrain, weather conditions, and/or other factors. For example, radar may provide improved results in a polar grid arrangement rather than a rectangular grid. As another example, if the vehicle is driving in San Francisco, the system should account for the increased number of angled streets in comparison to a highway. Finally, for example, weather, such as fog may decrease visibility. Therefore, the layout or cell size may account for weather conditions.

Figure 2A:
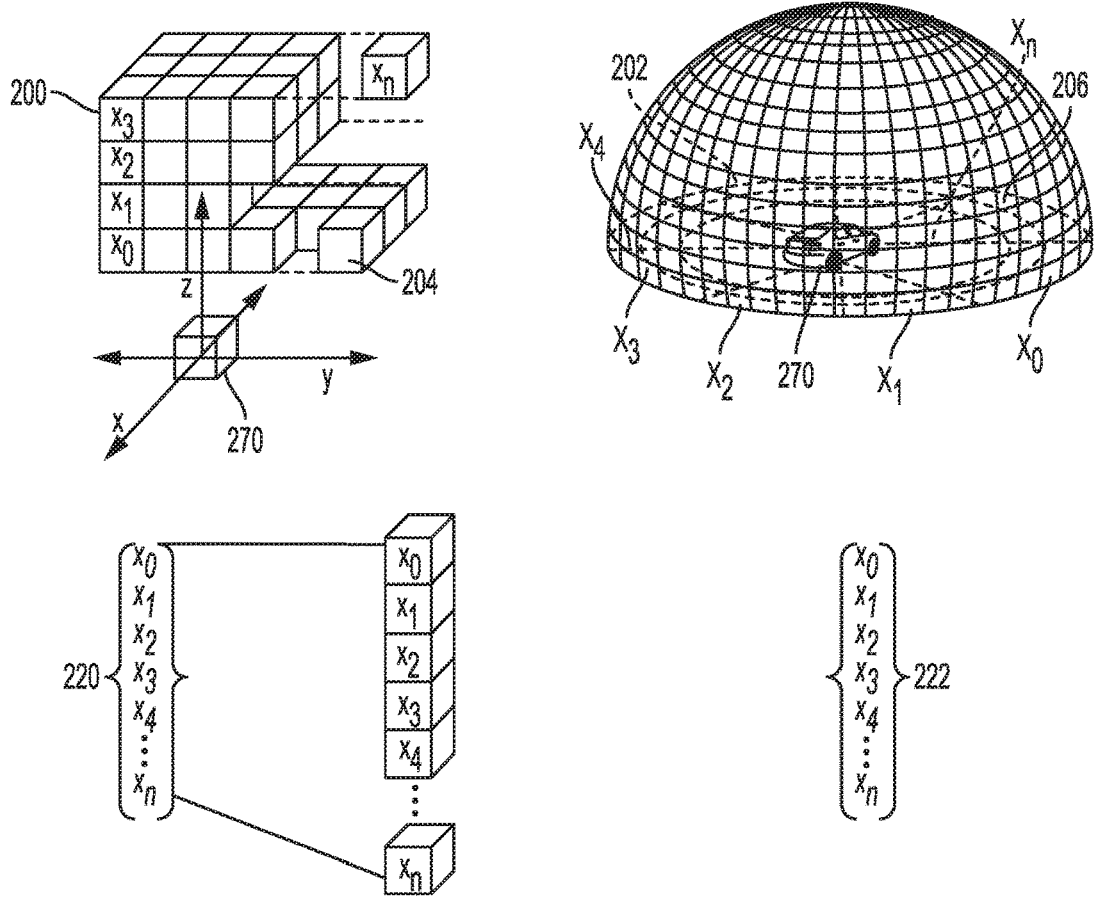
FIG. 2A illustrates examples of 3D grids according to aspects of the present disclosure.

FIG. 2A illustrates examples of different 3D grids 200, 202 according to aspects of the present disclosure. In FIG. 2A, a first 3D grid represents a spatial area in front of the agent 270. The cells 204 of the first 3D grid 200 may be uniformly partitioned into rows and columns. To illustrate the structure of the first 3D grid 200, each cell 204 of the 3D grid 200 is not illustrated in FIG. 2A. In another configuration, cells 206 of a second 3D grid 202 may be partitioned according to polar coordinates centered at the agent 270. Aspects of the present disclosure are not limited to the first 3D grid 200 or the second 3D grid 202 (e.g., 3D polar grid). Other types of output spaces are also contemplated, such as a logarithmic grid. FIG. 2A illustrates different 3D grids 200, 202. Still, aspects of the present disclosure are not limited to 3D grids, as other grids, such as 2D grids are also contemplated.

The cells 204, 206 of each 3D grid 200, 202 may be represented as elements in a vector 220, 220. For example, for the first 3D grid 200, each cell 204 represents an element $\{x_0, x_1, \ldots, x_n\}$ of a first vector 220. As another example, for the second 3D grid 202, each cell 206 represents an element $\{x_0, x_1, \ldots, x_n\}$ of a second vector 222. That is, each cell 204, 206 of a 3D grid 200, 202 may be mapped to an element of a vector 220, 222. In FIG. 2A, the specific mapping of the cells 204, 206 to elements of a vector 220, 222 is for illustrative purposes. Aspects of the present disclosure are not limited to the mapping illustrated in FIG. 2A.

Figure 2B:
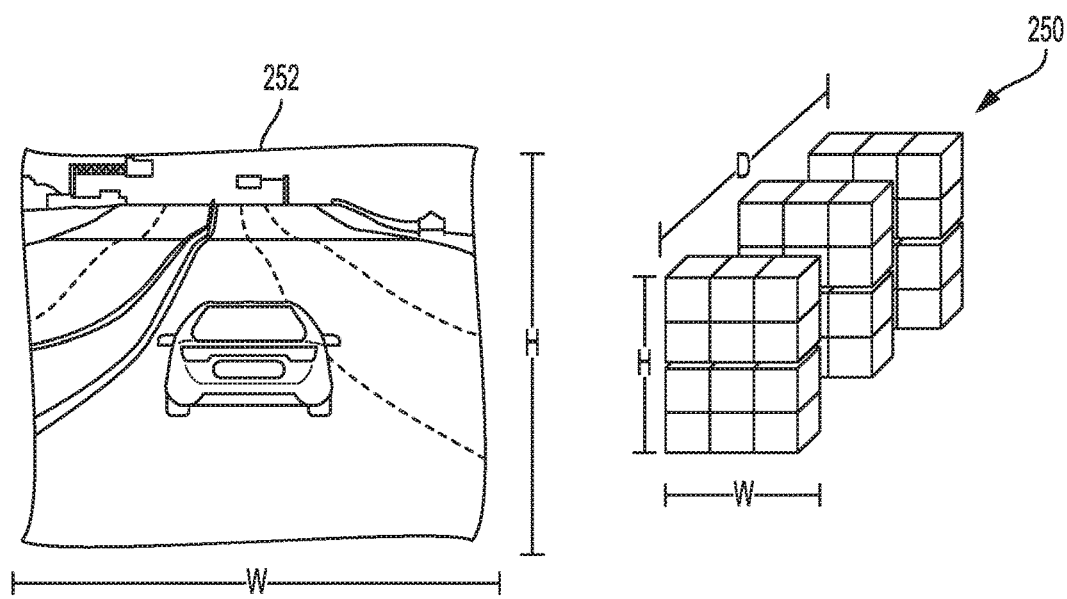
FIG. 2B illustrates an example of a 3D tensor according to aspects of the present disclosure.

As is known to those of skill in the art, features extracted from an image are encoded in a 3D tensor. FIG. 2B illustrates an example of a 3D tensor 250 and a 2D image 252 according to aspects of the present disclosure. The 3D tensor 250 encodes both the spatial structure and features of the 2D image 252. The first two dimensions of the 3D tensor 250 are a height (H) and a width (W) that correspond to the height (H) and the width (W) of the 2D image 252. The third dimension (D) encodes a number of feature channels, one for each spatial location (e.g., pixel). For example, three feature channels may be used to represent the three color channels (RGB) of the 2D image 252. Still, the number of channels for the third dimension may be adjusted based on the application domain and available data.

According to aspects of the present disclosure, the 3D grids 200, 202 represent a different feature space in comparison to a feature space of a sensor output, such as the 2D image 252. As such, the elements of vectors 220, 222 do not have a one-to-one mapping to the elements of a 3D tensor 250 that encodes the features and the spatial structure of a sensor output, such as the 2D image 252. Conventional systems provide a one-to-one mapping between a 3D tensor and a vector that represents 3D grid.

The conventional one-to-one mapping limits the type of inference that may be performed. Furthermore, the conventional one-to-one mapping also prevents combining features from sensors with outputs of different dimensions. Aspects of the present disclosure provide merge and reshape features from different feature spaces. The reshaped features may then be mapped to a feature space of a vector that represents a layout of a 3D grid. As such, aspects of the present disclosure improve 3D inference by providing a 3D inference system that infers 3D objects based on the output of multiple sensors regardless of the layout of a 3D grid.

As discussed above, a 3D inference system is trained to map features extracted from sensor outputs to a representation (e.g., vector) of a 3D grid. In one configuration, during an offline training step, the 3D inference system acquires features extracted from different sensor outputs (e.g., LIDAR output and 2D camera output). Furthermore, the 3D inference system is trained to generate merged features by matching, reshaping, and combining the features based on a layout of the 3D grid. The merged features are then mapped to cells of the 3D grid that are defined as elements of a vector. After mapping the merged features, the mapped features are classified by a trained neural network. The classified features may be used to infer 3D objects in a spatial area.

Figure 3:
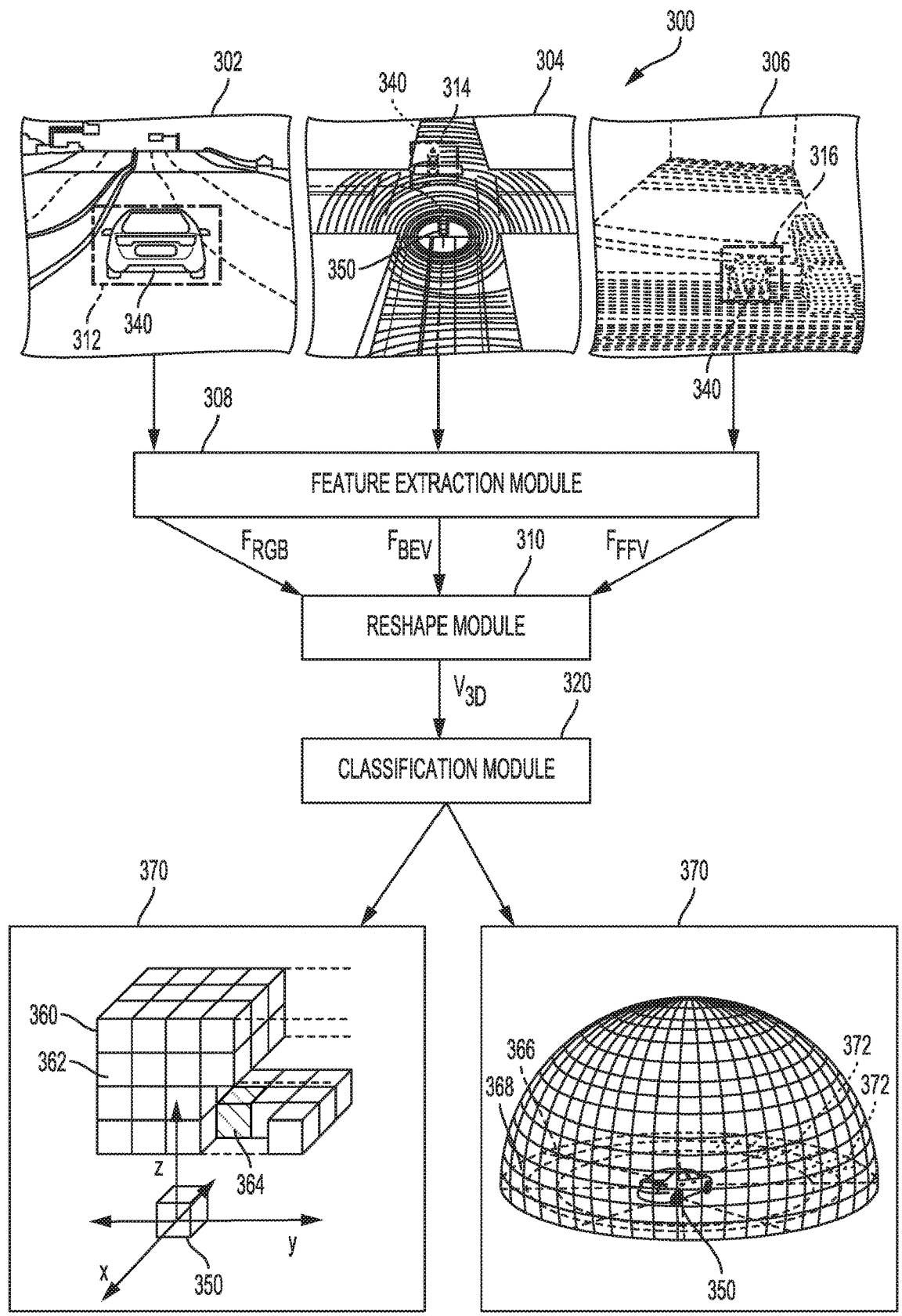
FIGS. 3 and 4 illustrate examples of training a 3D inference system according to aspects of the present disclosure.

FIG. 3 illustrates an example of training a 3D inference system 300 according to aspects of the present disclosure. As shown in FIG. 3, different sensor outputs 302, 304, 306 are received from different sensors of an agent. In this example, a first sensor output 302 is an image from a 2D camera. The second sensor output 304 may be a birds-eye-view output from a LIDAR sensor. The third sensor output 306 may be an agent's forward facing view from the LIDAR sensor. Of course, other types of sensor outputs, such as a side view or a rear view, are also contemplated from the aforementioned sensors and/or other types of sensors.

The sensor outputs 302, 304, 306 are received at a feature extraction module 308. The feature extraction module 308 may be a convolutional neural network or another type of artificial neural network, such as a support vector machine (SVM), for extracting features from each sensor output 302, 304, 306. For example, the features from the first sensor output 302 are encoded in an RGB image tensor ($F_{RGB}$). The features from the second sensor output 304 may be encoded in a bird's eye view (BEV) tensor ($F_{BEV}$). Finally, the features from the third sensor output 306 may be encoded in a forward facing view (FFV) tensor ($F_{FFV}$). Each tensor $F_{RGB}$, $F_{BEV}$, $F_{FFV}$ may have three dimensions (Height× Width×Depth).

The resolution of each tensor $F_{RGB}$, $F_{BEV}$, $F_{FFV}$ may be based on a size of a corresponding sensor output 302, 304, 306. Because the resolution of each sensor output 302, 304, 306 may be different, the resolution of each tensor $F_{RGB}$, $F_{BEV}$, $F_{FFV}$ may also be different. For example, the first sensor output 302 may be a high definition image with a higher resolution in comparison to the second sensor output 304 and the third sensor output 306. In this example, the resolution of the RGB image tensor ($F_{RGB}$) may be greater than the resolution of the birds-eye-view tensor ($F_{BEV}$) and the forward facing view tensor ($F_{FFV}$).

As shown in FIG. 3, each sensor output 302, 304, 306 provides a different perspective of the agent's environment. As such, each tensor $F_{RGB}$, $F_{BEV}$, $F_{FFV}$ represents a different feature space. For example, each sensor output 302, 304, 306 may provide a representation of a vehicle 340. Still, a location 312, 314, 316 of the vehicle 340 in one sensor output 302, 304, 306 does not have a one-to-one correspondence to a location 312, 314, 316 of the vehicle 340 in another sensor output 302, 304, 306. For example, in the first sensor output 302, the location 312 of the vehicle 340 is in a center region of the frame. However, the center region of the first sensor output 302 does not correspond to a center region of the second sensor output 304. Rather, in this example, for the second sensor output 304, the location 314 of the vehicle 340 is in an upper region of the frame and the agent 350 is in the center region of the frame.

As previously discussed, each 3D grid 360, 366 represents a different feature space in comparison to a feature space encoded in each tensor $F_{RGB}$, $F_{BEV}$, $F_{FFV}$. As such, in contrast to conventional systems, elements of vectors corresponding to a layout of each 3D grid 360, 366 do not have a one-to-one mapping with elements of each tensor $F_{RGB}$, $F_{BEV}$, $F_{FFV}$. To map the features encoded in each tensor $F_{RGB}$, $F_{BEV}$, $F_{FFV}$ to a vector of a 3D grid 360, 366 ($V_{3D}$), the reshape module 310 performs a reshape operation.

In one configuration, the reshape module 310 is a fully connected layer that receives the tensors $F_{RGB}$, $F_{BEV}$, $F_{FFV}$ corresponding to each sensor output 302, 304, 306. The reshape module 310 performs a reshape (e.g., matrix multiplication) to output a 3D grid vector ($V_{3D}$) corresponding to a layout of the 3D grid 360, 366. That is, the reshape module 310 includes a reshape function F( ) that receives tensors ($F_{RGB}$, $F_{BEV}$, $F_{FFV}$) as an input x to generate an output y ($V_{3D}$). The reshape function F( ) may be as follows:

$$V_{3D} = [M] \begin{bmatrix} F_{RGB} \\ F_{BEV} \\ F_{FFV} \end{bmatrix} \qquad (1)$$

where M is a matrix, $V_{3D}$ is the 3D grid vector with elements corresponding to a layout of the 3D grid 360, 366, and $F_{RGB}$, $F_{BEV}$, $F_{FFV}$ are tensors corresponding to each sensor output 302, 304, 306. The elements of the 3D grid vector ($V_{3D}$) change based on the layout of the 3D grid 360, 366. The reshape module 310 determines the feature space that is represented by the 3D grid 360, 366 prior to performing the reshape function.

The 3D grid vector ($V_{3D}$) may be interpreted by a classification module 322 to infer the 3D objects in a spatial area 370. The features encoded in the 3D grid vector ($V_{3D}$) may be processed by a convolutional neural network, or other type of neural network, of the classification module 322. As each element of a 3D grid vector ($V_{3D}$) corresponds to a cell 362, 368 of a 3D grid 360, 366, the location 364, 372 of a classified object in a 3D grid 360, 366 may be determined based on the classification.

That is, in this example, each sensor output 302, 304, 306 depicts a vehicle 340 in front of the agent 350. The features of the vehicle 340 may be encoded in each tensor $F_{RGB}$, $F_{BEV}$, $F_{FFV}$ and then mapped to the 3D grid vector ($V_{3D}$). The vehicle 340 features encoded in the 3D grid vector ($V_{3D}$) may be classified to determine a class of the vehicle 340 (e.g., car), an orientation of the vehicle 340, a distance between the vehicle 340 and the agent 350, and/or other information.

In one example, a 3D grid 360 of cells 362 is defined relative to a location of the agent 350. As each element of the 3D grid vector ($V_{3D}$) corresponds to a cell 362 of the 3D grid 360, the classified features from the 3D grid vector ($V_{3D}$) may be projected to a corresponding cell 364. As such, the agent 350 may determine a location and orientation of 3D objects in a spatial environment 370.

In another example, a 3D polar grid 366 of cells 368 is centered to a location of the agent 350. As each element of the 3D grid vector ($V_{3D}$) corresponds to a cell 368 of the 3D polar grid 366, the classified features from the 3D grid vector ($V_{3D}$) may be projected to one or more corresponding cells 372. In this example, by distinguishing cells 372 that correspond to the location of the 3D object (e.g., the vehicle 340), the 3D polar grid 366 may assist the agent 350 in determining areas of interest in a spatial environment 370.

In one configuration, the reshape module 310 is a deep convolutional neural network that is trained on a loss between a predicted 3D grid vector ($V_{3D}$) and a ground truth 3D grid vector ($V^*_{3D}$). The ground truth 3D grid vector ($V^*_{3D}$) is a vector that corresponds to a ground-truth 3D grid. The ground truth 3D grid vector ($V^*_{3D}$) encodes features corresponding to an actual location of an object in the ground-truth 3D grid.

Figure 4:
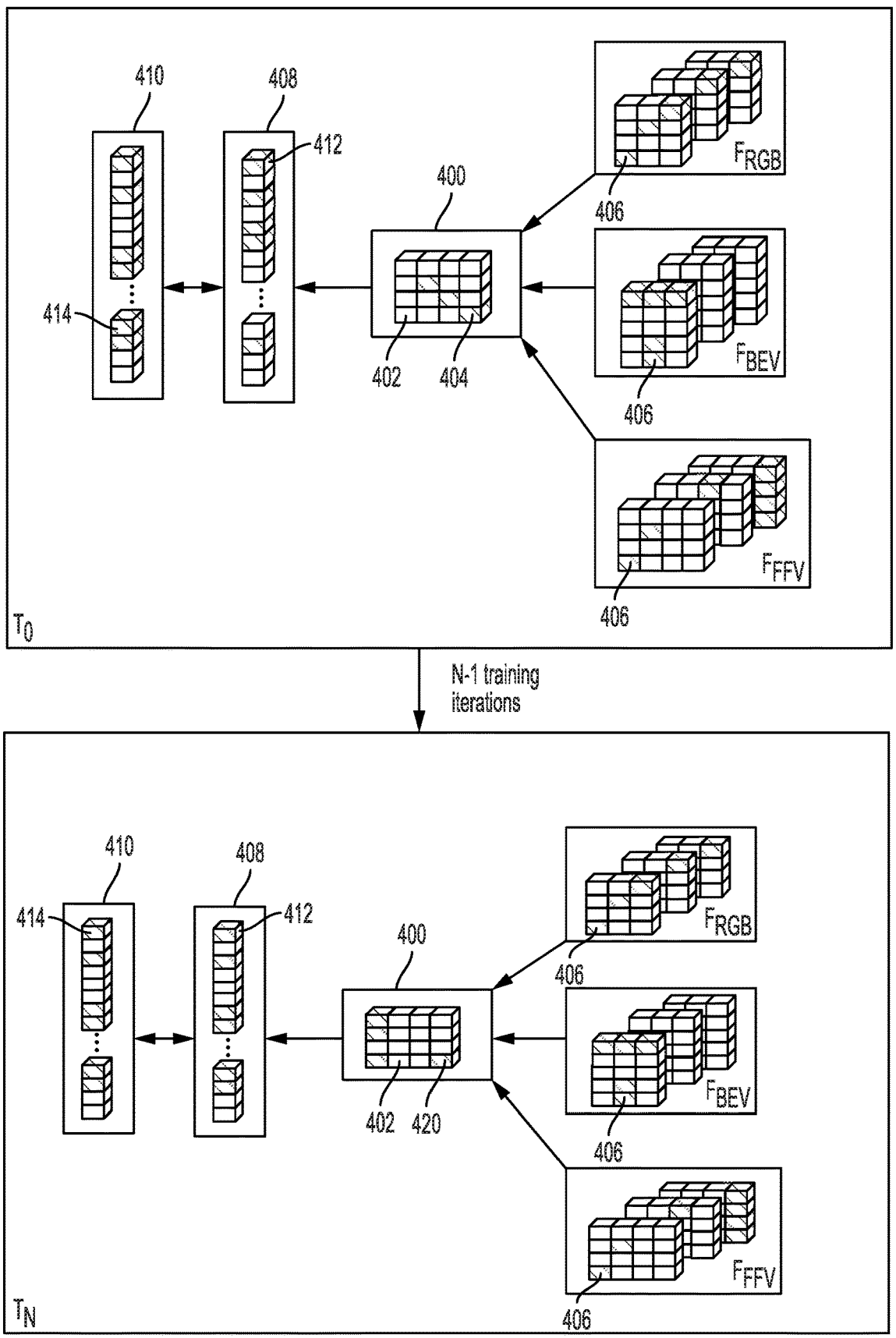

FIG. 4 illustrates an example of training a reshape module 400 according to aspects of the present disclosure. As shown in FIG. 4, the reshape module 400 includes a matrix 402. During training, at an initial training iteration ($T_0$) parameters 404 of the matrix 402 may be initialized based on initialization parameters. The reshape module 400 receives an input (x). In this example, the input (x) includes tensors $F_{RGB}$, $F_{BEV}$, $F_{FFV}$ of features 406 encoded from sensor outputs. Each tensor $F_{RGB}$, $F_{BEV}$, $F_{FFV}$ has different dimensions and corresponds to a different spatial representation of a sensor output. Furthermore, the locations of the features 406 are different in each tensor $F_{RGB}$, $F_{BEV}$, $F_{FFV}$.

The reshape module 400 performs a reshape function (e.g., vectorization) of the tensors $F_{RGB}$, $F_{BEV}$, $F_{FFV}$ by applying the matrix 402 to the tensors $F_{RGB}$, $F_{BEV}$, $F_{FFV}$. The reshape function (F( )) generates an output vector 408 (y) (e.g., $V_{3D}$). The output vector 408 encodes features 412 from the input tensors $F_{RGB}$, $F_{BEV}$, $F_{FFV}$. The features 412 encoded in the output vector 408 correspond to different cells of a 3D grid.

During training, the output vector 408 is compared to a ground truth vector 410 (y*) (e.g., $V^*_{3D}$). The features 414 encoded in the ground truth vector 410 correspond to ground truth locations of objects in cells of the 3D grid. A loss function (|y*−y|) determines the loss between the ground truth vector 410 and the output vector 408. The reshape module 400 is trained to minimize the loss. (|y*−y|) is an example of a loss function, aspects of the present disclose are directed to minimizing an error function and are not limited to a specific loss function.

As shown in FIG. 4, the parameters of the matrix 402 may be updated after each training iteration. As such, after N−1 training iterations, at the $N^{th}$ training iteration ($T_N$), the parameters 420 of the matrix 402 may be different in comparison to the parameters 404 of the matrix 402 at initial training iteration ($T_0$). In this example, at the $N^{th}$ training iteration ($T_N$), the reshape module 400 has been trained to minimize the loss between the ground truth vector 410 and the output vector 408. Thus, at the $N^{th}$ training iteration ($T_N$), the locations of the features 412 encoded in the output vector 408 are similar to the locations of the features 414 encoded in the ground truth vector 410. In one example, a reshape function may be an indicator function which activates/deactivates (e.g., gates) the inputs by multiplying the inputs with 0 or 1. In this example, the reshape matrix M is binary and reshapes the input by routing the information to the output.

The reshape module of the present application may use a deep learning architecture. The deep learning architecture may be embodied in a deep convolutional neural network (CNN). During training, the CNN may be presented with various viewpoints of various object categories. The network designer may want the CNN to output an estimate of an unknown object and corresponding pose with a high degree of confidence. Before training, the output produced by the CNN is likely to be incorrect, and so an error may be calculated between the actual output and the target output. The weights of the CNN may then be adjusted so that the output of the CNN are more closely aligned with the target (e.g., ground truth).

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

Figure 5:
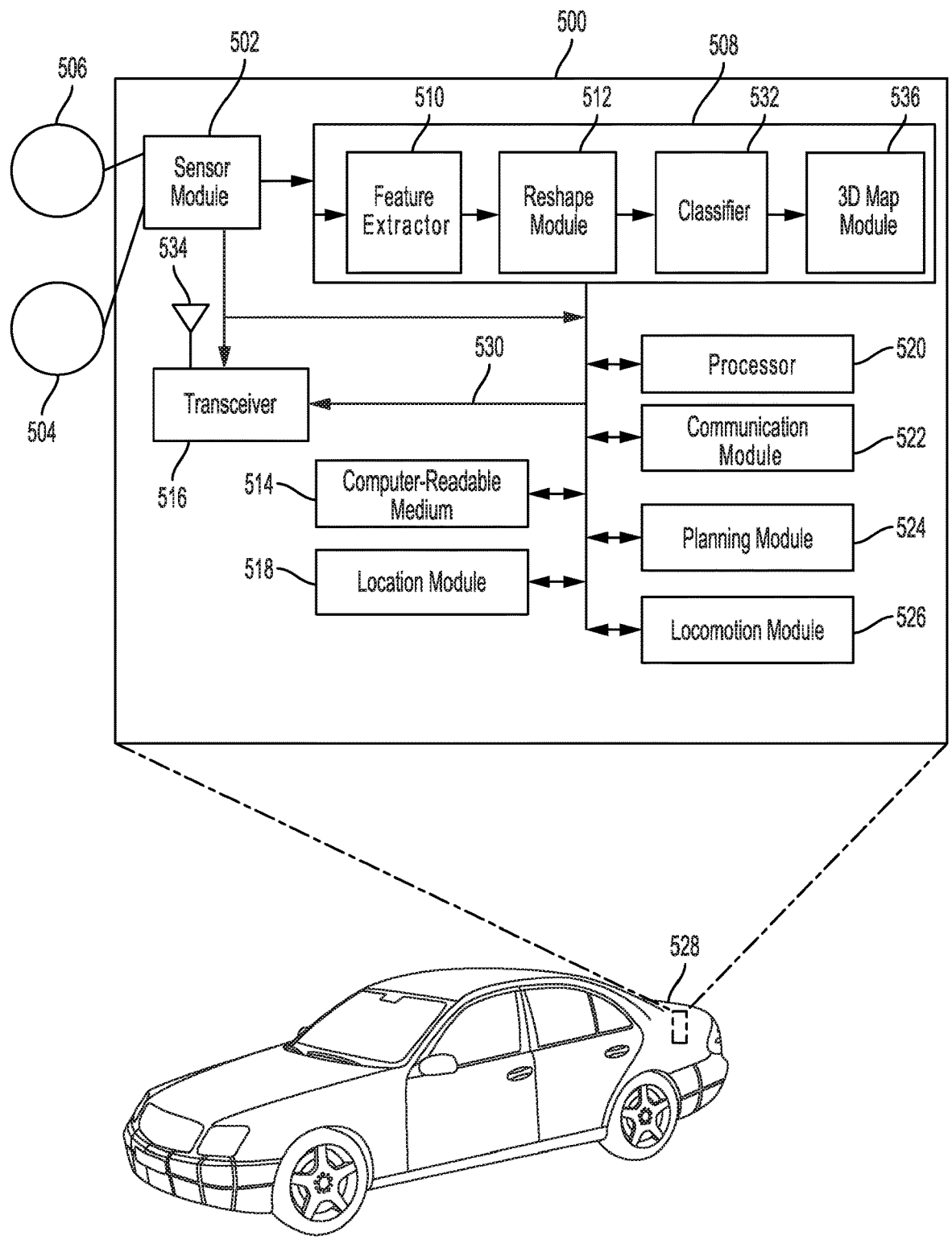
FIG. 5 is a diagram illustrating an example of a hardware implementation for a 3D inference system according to aspects of the present disclosure.

FIG. 5 is a diagram illustrating an example of a hardware implementation for a 3D inference system 500 according to aspects of the present disclosure. The 3D inference system 500 may be a component of a vehicle, a robotic device, or other device. For example, as shown in FIG. 5, the 3D inference system 500 is a component of a car 528. Of course, aspects of the present disclosure are not limited to the 3D inference system 500 being a component of the car 528, as other devices, such as a bus, boat, drone, or robot, are also contemplated for using the 3D inference system 500.

The 3D inference system 500 may be implemented with a bus architecture, represented generally by a bus 530. The bus 530 may include any number of interconnecting buses and bridges depending on the specific application of the 3D inference system 500 and the overall design constraints. The bus 530 links together various circuits including one or more processors and/or hardware modules, represented by a processor 520, a communication module 522, a location module 518, a sensor module 502, a locomotion module 526, a planning module 524, and a computer-readable medium 514. The bus 530 may also link various other circuits such as timing sources, peripherals, voltage regulators, and power management circuits, which are well known in the art, and therefore, will not be described any further.

The 3D inference system 500 includes a transceiver 516 coupled to the processor 520, the sensor module 502, an artificial neural network module 508, the communication module 522, the location module 518, the locomotion module 526, the planning module 524, and the computer-readable medium 514. The transceiver 516 is coupled to an antennae 534. The transceiver 516 communicates with various other devices over a transmission medium. For example, the transceiver 516 may receive commands via transmissions from a user or a remote device. As another example, the transceiver 516 may transmit driving statistics and information from the artificial neural network module 508 to a server (not shown).

The 3D inference system 500 includes the processor 520 coupled to the computer-readable medium 514. The processor 520 performs processing, including the execution of software stored on the computer-readable medium 514 providing functionality according to the disclosure. The software, when executed by the processor 520, causes the 3D inference system 500 to perform the various functions described for a particular device, such as the car 528, or any of the modules 502, 508, 514, 516, 518, 520, 522, 524, 526. The computer-readable medium 514 may also be used for storing data that is manipulated by the processor 520 when executing the software.

The sensor module 502 may be used to obtain measurements via different sensors, such as a first sensor 506 and a second sensor 504. The first sensor 506 may be a vision sensor, such as a stereoscopic camera or an RGB camera, for capturing 2D images. The second sensor 504 may be a ranging sensor, such as a light detection and ranging (LIDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 504, 506. The measurements of the first sensor 506 and the second sensor 504 may be processed by one or more of the processor 520, the sensor module 502, the artificial neural network module 508, the communication module 522, the location module 518, the locomotion module 526, the planning module 524, in conjunction with the computer-readable medium 514 to implement the functionality described herein. In one configuration, the data captured by the first sensor 506 and the second sensor 504 may be transmitted to an external device via the transceiver 516. The first sensor 506 and the second sensor 504 may be coupled to the car 528 or may be in communication with the car 528.

The location module 518 may be used to determine a location of the car 528. For example, the location module 518 may use a global positioning system (GPS) to determine the location of the car 528. The communication module 522 may be used to facilitate communications via the transceiver 516. For example, the communication module 522 may be configured to provide communication capabilities via different wireless protocols, such as WiFi, long term evolution (LTE), 3G, etc. The communication module 522 may also be used to communicate with other components of the car 528 that are not modules of the 3D inference system 500.

The locomotion module 526 may be used to facilitate locomotion of the car 528. As an example, the locomotion module 526 may control movement of the wheels. As another example, the locomotion module 526 may be in communication with a power source of the car 528, such as an engine or batteries. Of course, aspects of the present disclosure are not limited to providing locomotion via wheels and are contemplated for other types of components for providing locomotion, such as propellers, treads, fins, and/or jet engines.

The 3D inference system 500 also includes a planning module 524 for planning a route or controlling the locomotion of the car 528, via the locomotion module 526, based on the analysis performed by the artificial neural network 508. In one configuration, the planning module 524 overrides the user input when the user input is expected (e.g., predicted) to cause a collision. The modules may be software modules running in the processor 520, resident/stored in the computer-readable medium 514, one or more hardware modules coupled to the processor 520, or some combination thereof.

The artificial neural network 508 may be in communication with the sensor module 502, the transceiver 516, the processor 520, the communication module 522, the location module 518, the locomotion module 526, the planning module 524, and the computer-readable medium 514. In one configuration, the artificial neural network 508 receives sensor data from the sensor module 502. The sensor module 502 may receive the sensor data from the first sensor 506 and the second sensor 504. According to aspects of the disclosure, the sensor module 502 may filter the data to remove noise, encode the data, decode the data, merge the data, extract frames, or perform other functions. In an alternate configuration, the artificial neural network 508 may receive sensor data directly from the first sensor 506 and the second sensor 504.

As shown in FIG. 5, the artificial neural network 508 may include a feature extractor 510, a reshape module 512, a classifier 532, and a 3D map module 536. The feature extractor 510, the reshape module 512, the classifier 532, and the 3D map module 536 may be components of a same or different artificial neural network, such as a deep convolutional neural network (CNN). The artificial neural network 508 is not limited to a CNN and may be another type of artificial neural network (e.g., machine learning model). The feature extractor 510 receives a data stream from the first sensor 506 and the second sensor 504. The data stream may include a 2D RGB image from the first sensor 506 and LIDAR data points from the second sensor 504. Different spatial environments may be captured in each data stream. Additionally, the LIDAR data points may be separated to multiple streams. For example, one LIDAR data stream may provide a bird's eye view spatial representation and another LIDAR data stream may provide a forward facing view spatial representation. The data stream may include multiple frames, such as image frames.

The feature extractor 510 extracts (e.g., identifies) areas of interest from each frame of the data stream. For example, the feature extractor 510 may be trained to extract features of 3D objects. As another example, the feature extractor 510 may be trained to extract features of different terrains, such as roads, sidewalks, buildings, and background. That is, the feature exactor 510 identifies areas of attention based on the training. The artificial neural network 508 may include one or more feature extractors 510. For example, one feature extractor 510 may be configured to detect 3D objects and another feature extractor 510 may be configured to segment different elements of the data, such as roads, sidewalks, buildings, and background. In another example, each data stream output from a sensor 502, 504 may be received at distinct feature extractors 510.

The feature extractor 510 may encode each set of features in a multi-dimensional tensor. The reshape module 512 receives the multi-dimensional tensors from the feature extractor 510 to reshape the multi-dimensional tensor to a vector corresponding to a layout of a 3D grid. The reshape module 512 may be a fully connected layer of the CNN that has been trained to match, reshape, and combine the features from the multi-dimensional tensors to a single vector. The reshape module 512 outputs the vector corresponding to cells of the 3D grid.

As previously discussed, each 3D grid includes multiple cells. The cells may be different sizes and/or orientations based on the type of analysis to be performed. For example, the cell size may be structured based on potential areas of interest relative to a driving direction, a road direction, and/or driving decisions. The same set of sensor data may be mapped to different 3D grids having different structures to perform different types of object recognition based on a balance of accuracy and system performance.

The classifier 532 classifies the features in the vector output from the reshape module 512. The classifier 532 may classify (e.g., label) one or more objects based on the merged features. Furthermore, the classifier 532 may determine the object's orientation and/or other attributes. The classifications from the classifier 532 may be output to a 3D map module 536. The 3D map module 356 may use the classifications to obtain a global representation of the vehicle's environment (e.g., where is the vehicle and where are other objects in relation to the vehicle). The global representation may be a 3D map of the environment. Based on the global representation, the other modules may reason about future actions.

The artificial neural network 508 may output the classified features and/or the global representation to one or more of the sensor module 502, the transceiver 516, the processor 520, the communication module 522, the location module 518, the locomotion module 526, the planning module 524, and the computer-readable medium 514. For example, the classified features may be output to the processor 520 to determine a set of actions that may be performed based on the detected objects and their respective locations in relationship to the car 528. The actions may be retrieved from the computer-readable medium 514 or the planning module 524. Additionally, based on the classified features, one or more of the modules 502, 508, 514, 516, 518, 520, 522, 524, 526 may determine or update an action for the car 528. The planning module 524 may perform route planning, collision avoidance, or other planning functionality based on the classified features.

Figure 6:
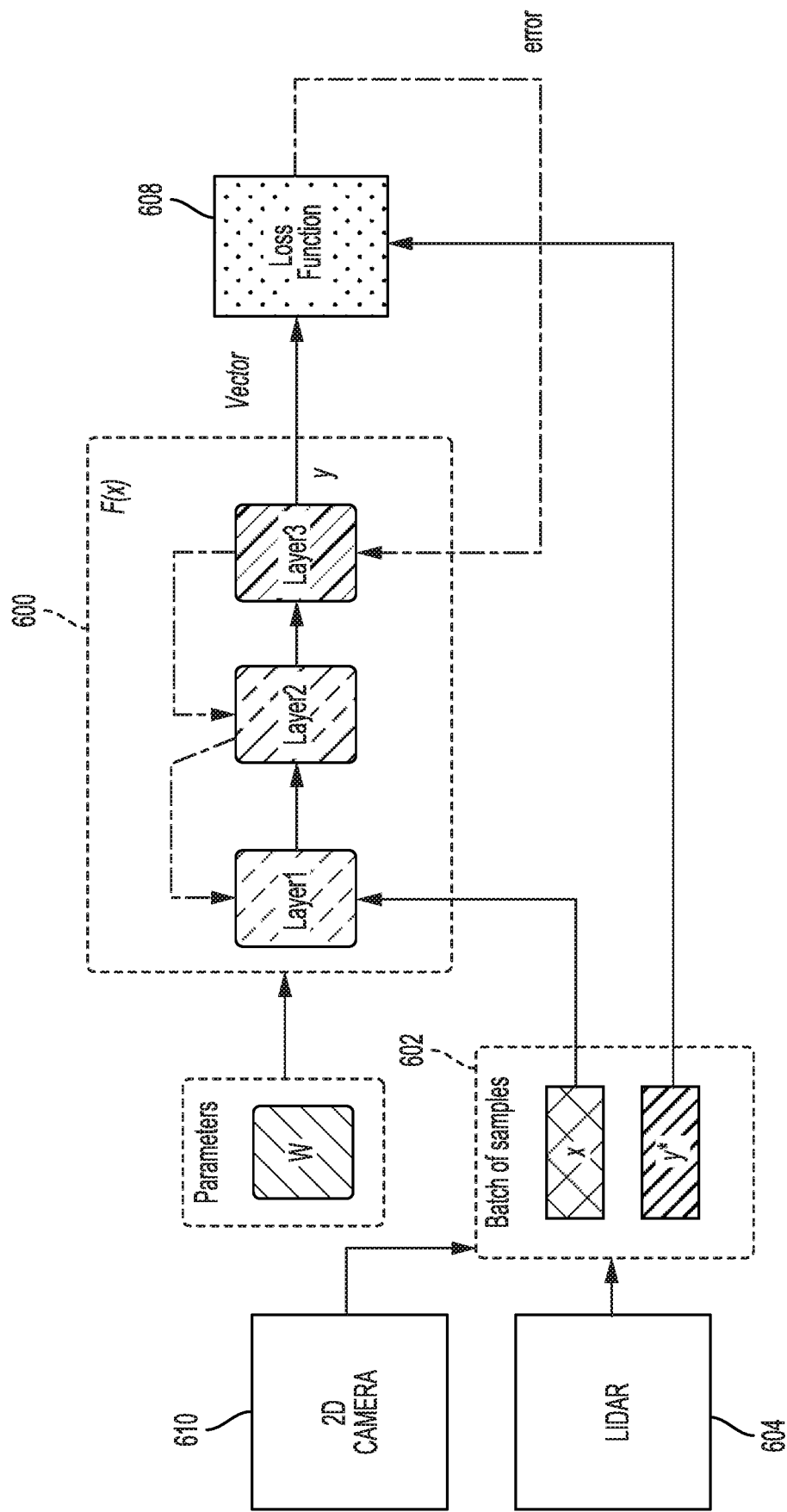
FIG. 6 illustrates a flow diagram for training a 3D inference model according to aspects of the present disclosure.

Aspects of the present disclosure are directed to training a 3D inference model to merge and map features from different sensors to a 3D map. FIG. 6 illustrates a flow diagram for training a 3D inference model 600 according to aspects of the present disclosure. In one configuration, sensor data (x) may be received from different sensors 604, 610 at a data source 602, such as a server. For example, a 2D camera 610 and a LIDAR sensor 604 may provide sensor data (x). The data source may also store ground truth vectors (y*) corresponding to the sensor data (x).

The 3D inference model 600 may be initialized with a set of parameters w. The parameters may be used by layers of the 3D inference model 600, such as layer 1, layer 2, and layer 3, of the 3D inference model 600 to set weights and biases. Layer 3 may be a fully connected layer and may correspond to the merge module. The parameters may also set parameters of a matrix [m] of a merge module. A feature extractor and the merge module of FIG. 5 may be different layers of the 3D inference model 600. During training, the 3D inference model 600 receives sensor data (x) to transform the sensor data (x) to a vector (y). As previously discussed, the 3D inference model 600 may be based on a function F( ). The output (y) is a vector of features. The vector corresponds to cells of a 3D grid.

The output (y) of the 3D inference model 600 is received at a loss function 608. The loss function 608 compares the output (y) to the ground truth vector (y*). The error is the difference (e.g., loss) between the output (y) and the ground truth vector (y*). The error is output from the loss function 608 to the model 600. The error is backpropagated through the model 600 to update the parameters. The training may be performed during an offline phase of the 3D inference model 600.

Figure 7:
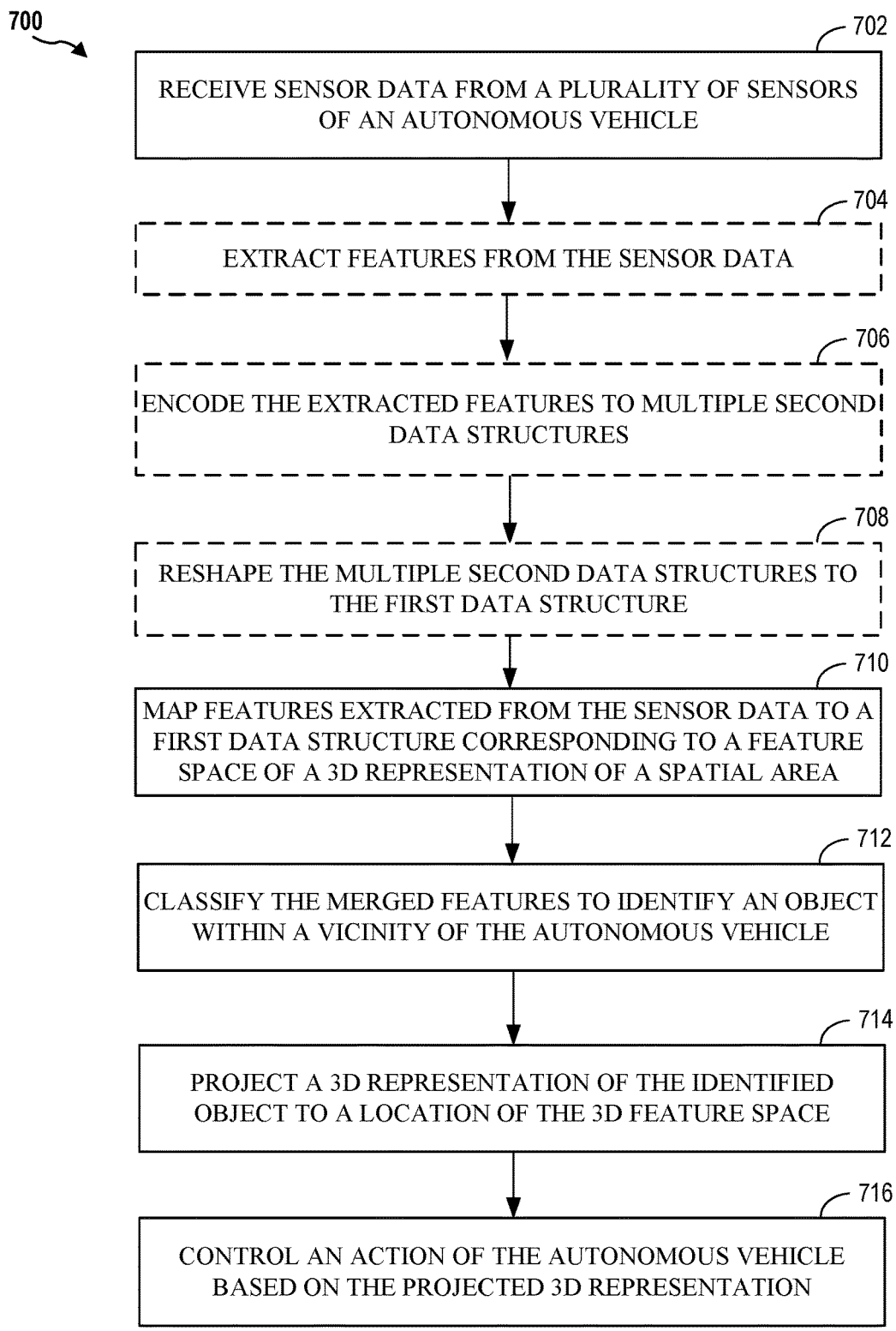
FIG. 7 illustrates a method for inferring a location of a 3D object according to aspects of the present disclosure.

FIG. 7 illustrates a method 700 for inferring a location of a 3D object using an artificial neural network according to an aspect of the present disclosure. At block 702, the artificial neural network receives sensor data from a plurality of sensors of an autonomous vehicle. The sensors may include a two-dimensional (2D) camera, a light detection and ranging (LIDAR) sensor, and/or another type of sensor. In an optional configuration, at block 704, the artificial neural network extracts features from the sensor data. In another optional configuration, at block 706, the artificial neural network encodes the extracted features to a plurality of second data structures. Each second data structure may correspond to a different sensor feature space.

Additionally, in another optional configuration, at block 708, the artificial neural network reshapes the plurality of second data structures to the first data structure. The sensor feature spaces may be different from the feature space of the 3D representation. At block 710, the artificial neural network maps features extracted from the sensor data to a first data structure corresponding to a feature space of a 3D representation of a spatial area. The 3D representation may be 3D grid of cells, such as a rectangular grid or a polar grid. Of course, a 2D representation and/or a 2D grid of cells is also contemplated. The feature space may be determined the feature space based on a layout of the cells.

The artificial neural network may determine the layout of cells based on at least one of a current behavior of the autonomous vehicle, a current location of the autonomous vehicle, a planned route, a driving direction, and/or previously detected objects. For example, the size and/or layout of the grid of cells may be based on a current behavior of the agent (e.g., stopped, moving, current speed, etc.). In another example, the size and/or layout may be based on current location of the agent (e.g., parking lot, freeway, school zone, residential area, etc.). Other factors such as sensor types, terrain, and weather conditions may also be considered when determining the size and/or layout.

Additionally, at block 712, the artificial neural network classifies the merged features to identify an object within a vicinity of the autonomous vehicle. Furthermore, at block 714, the artificial neural network projects a 3D representation of the identified object to a location of the 3D feature space. Finally, at block 716, the artificial neural network controls an action of the autonomous vehicle based on the projected 3D representation. Controlling the action may include planning a route for the autonomous vehicle or adjusting a planned route of the autonomous vehicle.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, but in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for inferring a location of a three-dimensional (3D) object, comprising:
   receiving sensor data from a plurality of sensors of an autonomous vehicle;
   extracting features from the sensor data;
   encoding the extracted features to a plurality of sensor space data structures, each sensor space data structure corresponding to a different sensor feature space;
   reshaping the plurality of sensor space data structures to a feature space data structure corresponding to a feature space of a 3D representation of a spatial area, each sensor space data structure being different from the feature space data structure;
   mapping features extracted from the sensor data to the feature space data structure;
   classifying the mapped features to identify the 3D object within a vicinity of the autonomous vehicle;
   projecting a 3D representation of the identified object to a location of the feature space; and
   controlling an action of the autonomous vehicle based on the projected 3D representation.

2. The method of claim 1, in which:
   the 3D representation of the spatial area is a 3D grid of cells; and
   the feature space is based on a layout of the cells.

3. The method of claim 2, further comprising determining the layout of the cells based on at least one of a current behavior of the autonomous vehicle, a current location of the autonomous vehicle, a planned route, a driving direction, previously detected objects, or a combination thereof.

4. The method of claim 1, in which the plurality of sensors comprise at least one of a two-dimensional (2D) camera, a light detection and ranging (LIDAR) sensor, or a combination thereof.

5. The method of claim 1, in which controlling the action comprises planning a route for the autonomous vehicle or adjusting a planned route of the autonomous vehicle.

6. An apparatus for inferring a location of a three-dimensional (3D) object, comprising:
   a memory; and
   at least one processor coupled to the memory, the at least one processor configured:
      to receive sensor data from a plurality of sensors of an autonomous vehicle;
      to extract features from the sensor data;
      to encode the extracted features to a plurality of sensor space data structures, each sensor space data structure corresponding to a different sensor feature space;
      to reshape the plurality of sensor space data structures to a feature space data structure corresponding to a feature space of a 3D representation of a spatial area, each sensor space data structure being different from the feature space data structure;
      to map features extracted from the sensor data to the feature space data structure;
      to classify the mapped features to identify the 3D object within a vicinity of the autonomous vehicle;
      to project a 3D representation of the identified object to a location of the feature space; and
      to control an action of the autonomous vehicle based on the projected 3D representation.

7. The apparatus of claim 6, in which:
   the 3D representation of the spatial area is a 3D grid of cells; and
   the feature space is based on a layout of the cells.

8. The apparatus of claim 7, in which the at least one processor is further configured to determine the layout of the cells based on at least one of a current behavior of the autonomous vehicle, a current location of the autonomous vehicle, a planned route, a driving direction, previously detected objects, or a combination thereof.

9. The apparatus of claim 6, in which the plurality of sensors comprise at least one of a two-dimensional (2D) camera, a light detection and ranging (LIDAR) sensor, or a combination thereof.

10. The apparatus of claim 6, in which the at least one processor is further configured to control the action by planning a route for the autonomous vehicle or adjusting a planned route of the autonomous vehicle.

11. A non-transitory computer-readable medium having program code recorded thereon for inferring a location of a three-dimensional (3D) object, the program code executed by a processor and comprising:
    program code to receive sensor data from a plurality of sensors of an autonomous vehicle;
    program code to extract features from the sensor data;
    program code to encode the extracted features to a plurality of sensor space data structures, each sensor space data structure corresponding to a different sensor feature space;
    program code to reshape the plurality of sensor space data structures to a feature space data structure corresponding to a feature space of a 3D representation of a spatial area, each sensor space data structure being different from the feature space data structure;
    program code to map features extracted from the sensor data to the feature space data structure;
    program code to classify the mapped features to identify the 3D object within a vicinity of the autonomous vehicle;
    program code to project a 3D representation of the identified object to a location of the feature space; and
    program code to control an action of the autonomous vehicle based on the projected 3D representation.

12. The non-transitory computer-readable medium of claim 11, in which:
    the 3D representation of the spatial area is a 3D grid of cells; and
    the feature space is based on a layout of the cells.

13. The non-transitory computer-readable medium of claim 12, in which the program code further comprises program code to determine the layout of the cells based on at least one of a current behavior of the autonomous vehicle, a current location of the autonomous vehicle, a planned route, a driving direction, previously detected objects, or a combination thereof.

14. The non-transitory computer-readable medium of claim 11, in which the plurality of sensors comprise at least one of a two-dimensional (2D) camera, a light detection and ranging (LIDAR) sensor, or a combination thereof.

* * * * *